United States Patent
Ivancic et al.

(10) Patent No.: US 9,977,729 B1
(45) Date of Patent: May 22, 2018

(54) TESTING APPLICATIONS WITH A DEFINED INPUT FORMAT

(71) Applicant: Google LLC, Mountain View, CA (US)

(72) Inventors: Franjo Ivancic, Princeton, NJ (US); Laszlo Szekeres, Brooklyn, NY (US); Domagoj Babic, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/360,554

(22) Filed: Nov. 23, 2016

(51) Int. Cl.
*G06F 9/44* (2006.01)
*G06F 11/36* (2006.01)
*G06F 17/22* (2006.01)
*G06F 17/24* (2006.01)
*G06N 3/04* (2006.01)
*G06N 3/08* (2006.01)

(52) U.S. Cl.
CPC ...... *G06F 11/3688* (2013.01); *G06F 11/3612* (2013.01); *G06F 17/2247* (2013.01); *G06F 17/24* (2013.01); *G06N 3/0445* (2013.01); *G06N 3/08* (2013.01)

(58) Field of Classification Search
CPC ........................................................ G06F 9/44
USPC ................................................. 717/124–131
See application file for complete search history.

(56) References Cited

U.S. PATENT DOCUMENTS

| 5,369,574 A * | 11/1994 | Masegi ................. G06F 17/279 704/2 |
| 5,523,945 A * | 6/1996 | Satoh ................ G06F 17/30684 704/9 |
| 5,634,083 A * | 5/1997 | Oerder .................. G10L 15/083 704/253 |
| 9,043,349 B1 * | 5/2015 | Lin .......................... G06K 9/18 382/257 |
| 2013/0212435 A1 | 8/2013 | Qiu et al. |
| 2016/0132415 A1 | 5/2016 | Dillard |

OTHER PUBLICATIONS

Andrej Karpathy, The Unreasonable Effectiveness of Recurrent Neural Networks, [online] Retrieved Oct. 11, 2016 Retrieved from the internet: <http://karpathy.github.io/2015/05/21/rnneffectiveness/>, May 21, 2015, 53 pages.
Neural Fuzzer, [online] Retrieved Oct. 11, 2016 Retrieved from the internet: <https://github.com/CIFASIS/neural-fuzzer/blob/master/README.md>, Jul. 4, 2016, 4 pages.

(Continued)

*Primary Examiner* — Jae U Jeon
(74) *Attorney, Agent, or Firm* — Lerner, David, Littenberg, Krumholz & Mentlik, LLP

(57) ABSTRACT

A system and method are provided for testing the performance of applications. By way of example only, the method may include training a neural network with documents containing text elements that are arranged in accordance with a defined format and using the neural network to determine the predictability of the value of individual text elements within a test document. When the neural network indicates that the value of a text element is unlikely, the value may be modified and the modified document may be used to test an application that processes documents in accordance with the defined format.

20 Claims, 6 Drawing Sheets

(56) References Cited

OTHER PUBLICATIONS

Matt Hillman, 15 Minute Guide to Fuzzing, [online] Retrieved Oct. 11, 2016 Retrieved from the internet: <https://www.mwriinfosecurity.com/our-thinking/15-minute-guide-to-fuzzing/> Aug. 8, 2013, 12 pages.

Christian Holler, Kim Herzig, and Andreas Zeller, Fuzzing with Code Fragments, 2012, 14 pages.

Patrice Godefroid, Adam Kiezun and Michael Y. Levin, Grammer-based Whitebox Fuzzing, 2008, 10 pages.

Vijay Ganesh, Tim Leek and Martin Rinard, Taint-based Directed Whitebox Fuzzing, 2009, 11 pages.

"Csmith" [online] Retrieved Jan. 18, 2017 Retrieved from the internet: <https://embed.cs.utah.edu/csmith>, 2 pages.

"A Crash Course to Radamsa", GitHub-aoh/radamsa: a general-purpose fuzzer [online] Retrieved Jan. 18, 2017 Retrieved from the internet: <https://github.com/aoh/radamsa> 10 pages.

Christoph Diehl, "Dharma" [online] Retrieved Jan. 18, 2017 Retrieved from the internet: <https://blog.mozilla.org/security/2015/06/29/dharma>, Jun. 29, 2015, 3 pages.

"American Fuzzy Lop" [online] Retrieved Jan. 18, 2017. Retrieved from the internet: <http://lcamtuf.coredumo.cx/afl/>, 5 pages.

"lcamtuf's blog: afl-fuzz: making up grammar with a dictionary in hand", [online] Retrieved Jan. 23, 2017. Retrieved from the internet: <https://lcamtuf.blogspot.com/2015/01/afl-fuzz-making-up-grammar-with.html>, Jan. 9, 2015, 6 pages.

"go-fuzz: Randomized testing for Go" [online] Retrieved Jan. 18, 2017 Retrieved from the internet: <https://github.com/dvyukov/gofuzz>, 11 pages.

"libFuzzer-a library for coverage-guided fuzz testing" [online] Retrieved Feb. 24, 2017 Retrieved from the internet: <http://llvm.org/docs/LibFuzzer.html>, Nov. 7, 2016, 12 pages.

"Language Model—Wikipedia", [online] Sep. 1, 2015 Retrieved Jan. 18, 2017 Retrieved from the internet: <https://en.wikipedia.org/w/index.php?title=Language_model&direction=prev&oldid=706060999> 6 pages.

"n-gram—Wikipedia", [online] Nov. 1, 2016 Retrieved Jan. 18, 2017 Retrieved from the internet: <https://en.wikipedia.org/w/index.php?title=Ngram&oldid=747293362>, 8 pages.

"Markov model—Wikipedia" [online] Retrieved Jan. 18, 2017 Retrieved from the internet: <https://en.wikipedia.org/w/index.php?title=Markov_model&oldid=750312328>, Nov. 19, 2016, 3 pages.

"Hidden Markov model—Wikipedia" [online] Retrieved Jan. 18, 2017 Retrieved from the internet: <https://en.wikipedia.org/w/index.php?title=Hidden_Markov_model&oldid=747826863>, Nov. 4, 2016, 16 pages.

"Recurrent neural network—Wikipedia" [online], Nov. 24, 2016 Retrieved Jan. 18, 2017 Retrieved from the internet; <https://en.wikipedia.org/w/index.php?title=Recurrent_neural_network&oldid=751206606>, 11 pages.

"Recurrent Neural Networks" [online] Retrieved Oct. 22, 2016 Retrieved from the internet: <https://www.tensorflow.org/versions/r0.11/tutorials/recurrent/index.html>, 6 pages.

"Gated recurrent unit—Wikipedia" [online] Nov. 23, 2016 Retrieved Jan. 18, 2017 Retrieved from the internet: <https://en.wikipedia.org/w/index.php?title=Gated_recurrent_unit&oldid=751094508>, 1 page.

"Long short-term memory—Wikipedia" [online]. Nov. 23, 2016 Retrieved Jan. 18, 2017. Retrieved from the internet: <https://en.wikipedia.org/w/index.php?title=Long_shortterm_memory&oldid=751131357>, 5 pages.

"Understanding LSTM Networks" [online]. Aug. 27, 2015 Retrieved Jan. 23, 2017 Retrieved from the internet: <https://colah_github.io/posts/2015-08-Understanding-LSTMS/>, 8 pages.

"Mutation testing" [online] Retrieved Feb. 24, 2017 Retrieved from the internet: <https://en.wikipedia.org/wiki/Mutation_testing>, Nov. 10, 2016, 5 pages.

"Using Cluster Fuzz—The Chromium Projects" [online] Retrieved Jan. 18, 2017 Retrieved from the internet: <https://www.chromium.org/Home/chromiumsecurity/bugs/usingclusterfuzz>, 12 pages.

"quokka" [online] Retrieved Jan. 18, 2017 Retrieved from the internet: <https://github.com/mozillasecurity/quokka>, 3 pages.

"Fuzzing—Wikipedia" [online] Nov. 21, 2016 Retrieved Jan. 18, 2017 Retrieved from the internet: <https://en.wikipedia.org/w/index.php?title=Fuzzing&oldid=750667969>, 5 pages.

"Dharma: Grammer-based Test Case Generation" [online] Retrieved Jan. 18, 2017 Retrieved from the internet: <https://code.google.com/archive/p/dharma/>, 1 page.

"Artificial neural network—Wikipedia" [online] Nov. 17, 2016 Retrieved Jan. 18, 2017 Retrieved from the internet: <https://en.wikipedia.org/w/index.php?title=Artificial_neural_network&oldid=750027709>, 20 pages.

Combined Search and Examination Report dated Mar. 6, 2018, for United Kingdom Patent Application No. 1715225.7. 9 pages.

Godefroid P., et al., "Learn&Fuzz: Machine Learning for Input Fuzzing." [online], arXiv.org, published Jan. 25, 2017, available from: https://arxiv.org/pdf/1701.07232.pdf.

Guo T., et al., "Gramfuzz: Fuzzing Testing of Web Browsers Based on Grammar Analysis and Structural Mutation", 2nd International Conference on Informatics & Applications, IEEE, Sep. 2013, pp. 212-215.

Lin Y., et al., "Browser Fuzzing by Scheduled Mutation and Generation of Document Object Models." 49th Annual International Carnahan Conference on Security Technology, Sep. 2015, IEEE, pp. 1-6.

Wang J., et al., "Skyfire: Data-Driven Seed Generation for Fuzzing." 2017 IEEE Symposium on Security and Privacy, IEEE Computer Society, May 2017, pp. 579-594.

\* cited by examiner

```
<!DOCTYPE html><html lang="en" xmlns="http://www.w3.org/1999/xhtml">
<head><meta charset="utf-8" /><title>Run 51029.00092 Doc 0x9D5950
</title></head><body> the rain continued the whole evening without
intermission; Jane certainly could not come back. <a
href= "https://books.google.com">Link </a></body></html>
```

```
<!DOCTYPE html><html lang="en" xmlns="http://www.w3.org/1999/xhtml">
<head><meta charset="utf-8" /><title>Run 51029.00092 Doc 0x9D5950
</title></head><body>  the rain continue the whole without
intermission. Jane certainly could not come back ali5dvpl,s0af.<a
  href="link">https://books.google.com</a></body></html>
```

805 — TEST REPORT
810 — Browser.exe
811 — Document: Doc 0x9D5950
815 — Score = 200
  Summary
820 — Render: Ok
821 — Java Script: Not Called
822 — Network Communications: Ok
823 — Security: Ok
830 — Third party plug-in #1: Ok
831 — Third party plug-in #2: Not Called
832 — Third party plug-in #3: FAIL (Could not parse)

FIGURE 8

905 — TEST REPORT
  Browser.exe
911 — Document: Doc 0x9D5950 rev 2
915 — Score = 270
  Summary
  Render: Ok
921 — Java Script: Ok
  Network Communications: Ok
  Security: Ok
930 — Third party plug-in #1: FAIL (BUFFER OVERFLOW)
  Third party plug-in #2: Called
931 — Third party plug-in #3: FAIL (Could not parse)

FIGURE 9

TESTING APPLICATIONS WITH A DEFINED INPUT FORMAT

BACKGROUND

Fuzz testing provides a technique for testing computer programs with the use of randomized input. For instance, fuzz-based testing techniques may be used to generate and modify test inputs, including file documents, that conform with a defined text format such as HyperText Markup Language (HTML), Portable Document Format (PDF) or Cascading Style Sheet (CSS) language. When the document is provided to an application for processing, the application may be monitored for unexpected or undesirable behaviors, such as crashes or exposing data to unauthorized access.

Certain generation-based fuzz techniques may randomly generate or change test documents based on a manually-specified grammar. For example, the requirements of a defined format may be written as a set of computer instructions that generate or change a sequence of random values such that the sequence remains fully consistent with the format. Complicated formats may make it difficult and cumbersome to create computer instructions that fully implement the grammar, e.g., are capable of iterating through all of the requirements or iterating through the requirements in unexpected ways. Moreover, small changes to the requirements of the defined format may require substantial changes to the computer instructions.

Certain mutation-based fuzz techniques may make small changes to an existing test document, analyze the results and then repeat the process. By way of example, a mutation-based fuzz technique may involve: selecting a document that conforms with a defined text format; mutating (e.g., modifying) the selected document by randomly changing characters (e.g., by bit flipping or byte incrementing), deleting characters, adding characters, or swapping strings of characters; processing the document using the application being tested; scoring the document based on its coverage (e.g., the identity of routines and the number of unique lines of code that were executed in the application as a result of processing the document) and; using the score as a fitness function in a genetic algorithm or the like to determine whether the document should be further mutated and scored. Documents that result in crashes or allow potentially malicious actions (e.g., buffer overflow) may also be selected for additional mutation and testing. Although mutation-based fuzz techniques are effective for certain formats such as media formats, they may be less effective than generation-based fuzz techniques when used in connection with complicated text formats.

SUMMARY

One aspect of the technology relates to a method that includes: receiving a sequence of values of text elements; determining, with one or more computing devices, a score for a text element value of the sequence, where the score is related to the probability of a particular text element value equaling one or more given values, and where said probability is based on sequences of text element values that are consistent with a defined format, comparing, with the one or more computing devices, the score to a threshold; when the score is below a threshold, modifying, with the one or more computing devices, the value of the text element to form a modified sequence of text element values; processing, with the one or more computing devices, the modified sequence of text element values with a set of instructions; and testing, with the one or more computing devices, a performance characteristic of the set of instructions when the set of instructions process the modified sequence of text element values.

Another aspect of the technology relates to a system that includes one or more computing devices and a memory storing instructions executable by the one or more computing devices, where the instructions include: receiving an initial sequence of text elements having values; determining a first score for the value of a first text element of the initial sequence, wherein determining a score with respect to the value of a particular text element in a particular sequence of text elements is related to how frequently the value of the particular text element follows same or similar sequences of text element values that are consistent with a defined format; determining a second score for the value of a second text element of the initial sequence, wherein there is a third text element between the first and second text elements in the initial sequence; comparing the first and second scores to a threshold; when the first and second scores are above the threshold, generating a second sequence of text elements having values, where the value of a first text element in the second sequence equals the value of the first text element in the initial sequence, the value of a second text element in the second sequence equals the value of the second text element in the initial sequence, the value of a third text element in the second sequence is different from the value of the third text element in the initial sequence, and the third text element is in between the first and second text elements in the sequence; processing, with the one or more computing devices, the second sequence of text elements with an application; and testing, with the one or more computing devices, a performance characteristic of the application when the application processes the modified sequence of text element values.

Yet another aspect of the system relates to a system of one or more computing devices and a storing instructions executable by the one or more computing devices, where the instructions include: receiving a document containing a sequence of text characters; determining a score for each of a plurality of characters of the document, wherein the score of a character is determined based on the value of the character, the value of one or more preceding characters in the document, and a machine learning component trained with sequences of characters conforming with the defined format; when the score of a character below a threshold, associating the character with a set of characters eligible for modification; modifying at least one of the characters in the set of characters; and after modifying at least one of the characters in the set of characters, measuring the performance of an application as the application processes the document.

BRIEF DESCRIPTION OF THE DRAWINGS

FIG. 4 is an example of a test document.

FIG. 6 is an example of a test document.

FIG. 7 is an example of a test document modified in accordance with aspects of the disclosure.

FIG. 8 is an example of performance characteristics of an application.

FIG. 9 is an example of performance characteristics of an application.

DETAILED DESCRIPTION

Overview

Figure 1:
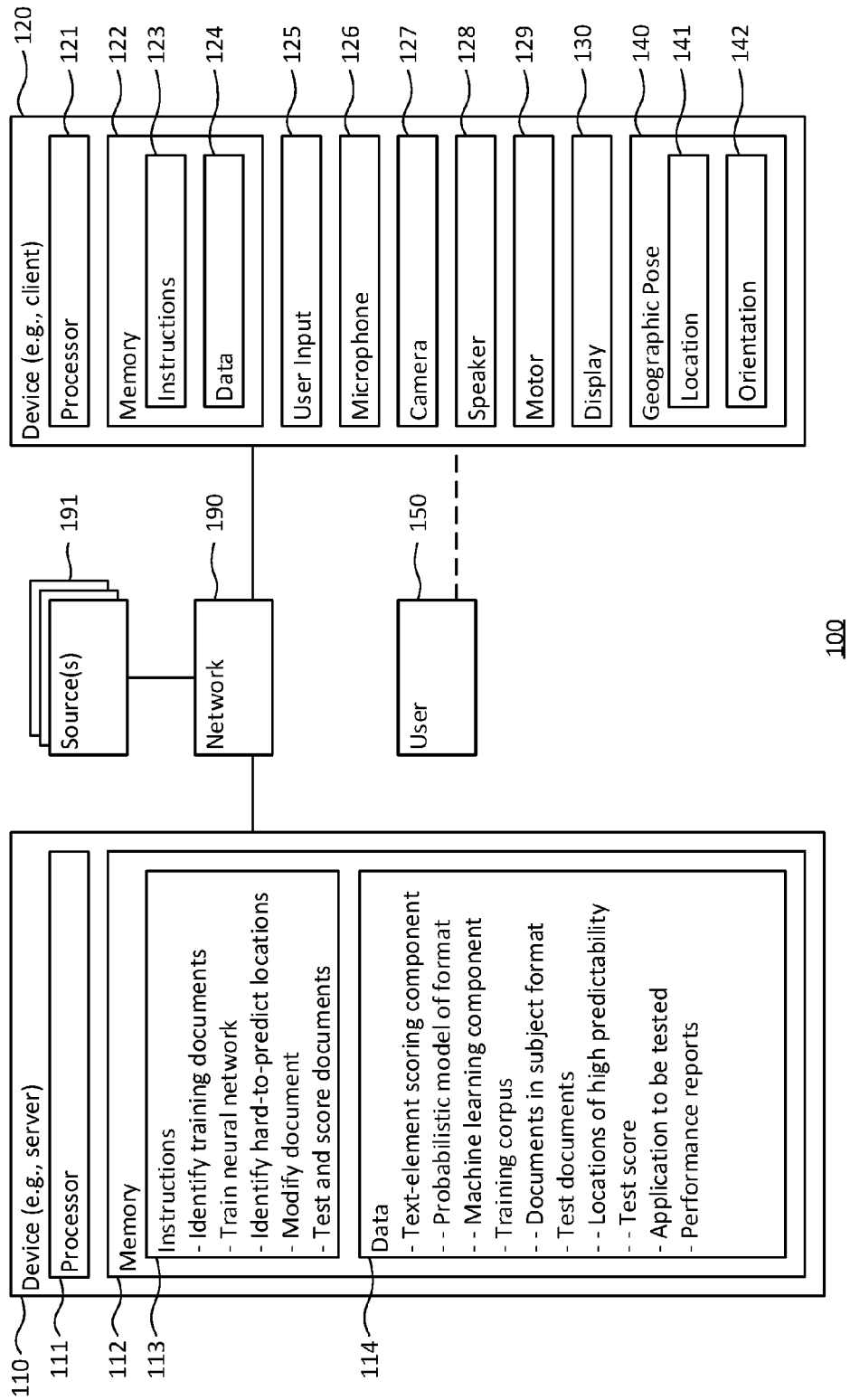
FIG. 1 is a functional diagram of a system in accordance with aspects of the disclosure.
Figure 2:
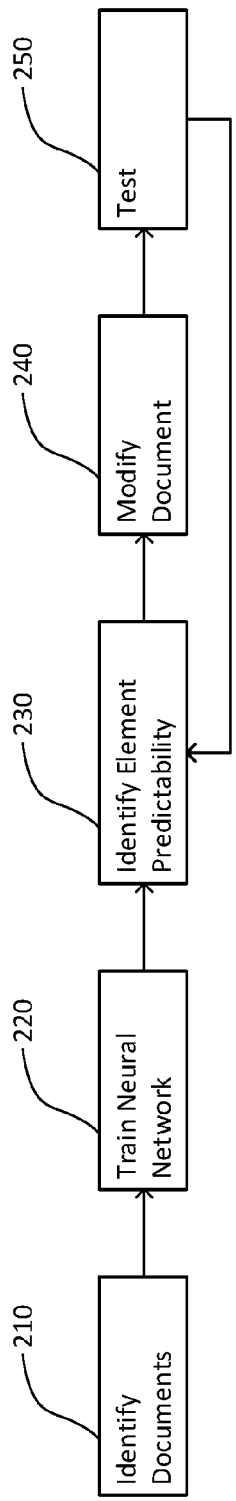
FIG. 2 is a flow diagram in accordance with aspects of the disclosure.

The technology relates to generating a sequence of text element values that may be used to measure the performance of instructions for a computing device. By way of example and as shown in FIGS. 1 and 2, a system 100 of one or more computing devices 110 and 120 may be used to identify documents that are consistent with a defined format (block 210), train a recurrent neural network with the documents (block 220), use the network to identify the predictability of text elements in a test document (block 230), modify the test document based on the predictability of the text elements (block 240), test an application with the test document (block 250) and, depending on the results of the test, repeat the process of identifying predictability, modifying the test document and testing the application.

Figure 3:
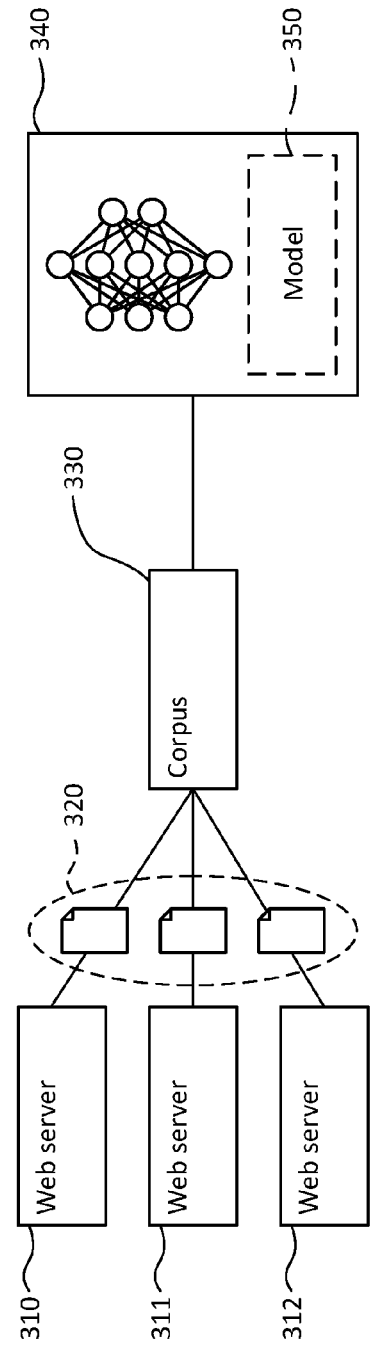
FIG. 3 is a flow diagram of the training of a neural network in accordance with aspects of the disclosure.

In that regard and as shown in FIG. 3, the system may identify documents that are consistent with a particular defined format and use those documents to train a machine learning component. For instance, the system may train neural network 340 with a corpus 330 of documents 320 that were retrieved from web servers 310-12.

Figure 5:
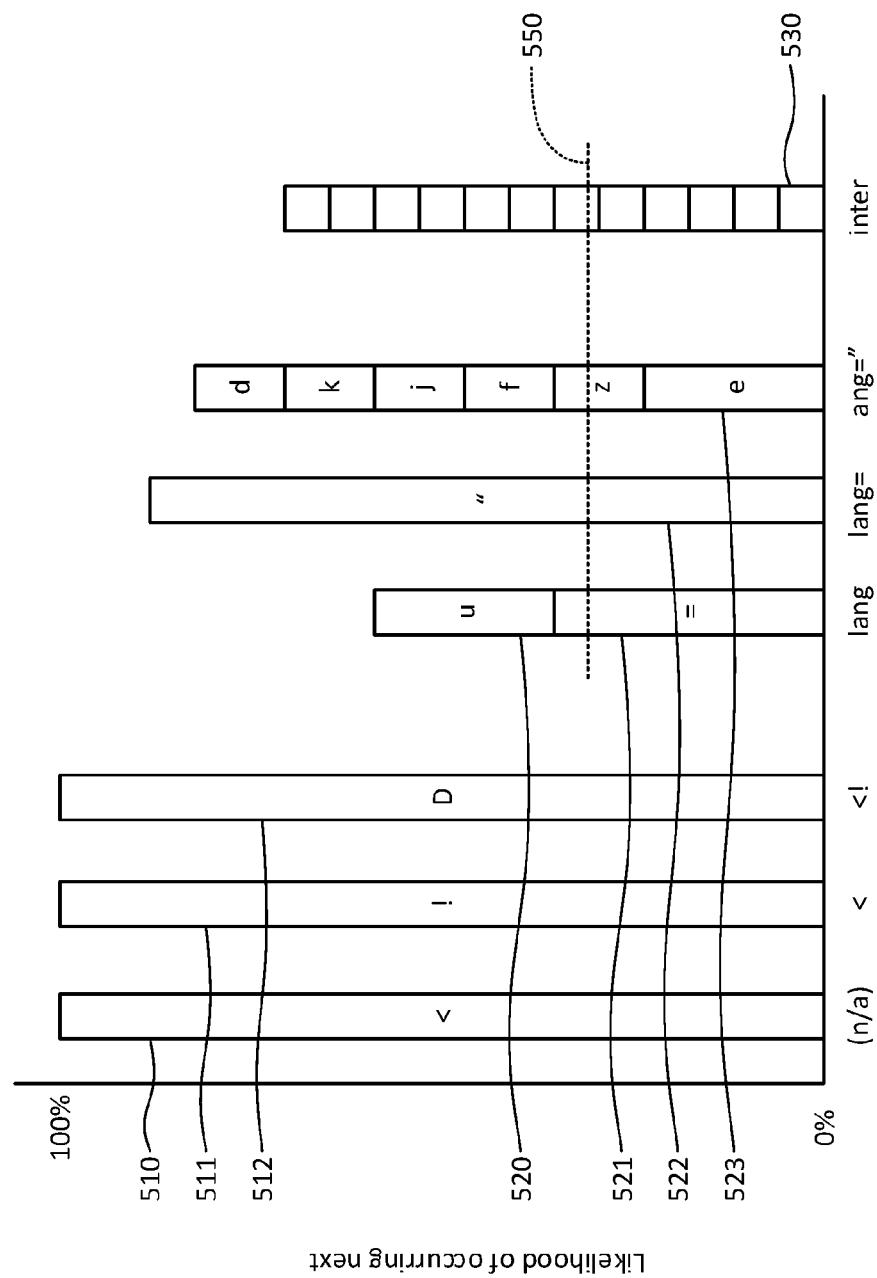
FIG. 5 is an example of likelihood values of text elements.

As shown in FIGS. 4-6, the system may use the machine learning component to identify the predictability of text elements within a test document. For instance, neural network 340 may return score values that indicate the predictability of the characters within portion 611 (e.g., string 410) is relatively high, the predictability of the first character in portion 610 is relatively moderate, and the predictability of the characters in portion 630 are relatively low. As a result, the system may assign relatively high scores to portions 610 and 630 and relatively low scores to portion 611.

The system may modify the identified portions based on the text element scores returned by the neural network. For example and as shown in FIG. 7, one or more of the characters in portions 610 and 630 may be changed, deleted or added.

The modified document may be provided to a set of computer instructions for testing. By way of example and as shown in FIG. 8, modified test document 700 may be provided to a browser application for testing and the system may measure various characteristics of the browser's performance, such as how many of the browser's instructions were executed or failed as a result. The system may determine a test score based on the performance and, as shown in FIG. 9, the modified document may be analyzed, modified, tested and scored again. If the test score increases, the document may be continuously analyzed, modified, tested and scored until its test score does not increase.

Example Systems

Systems such as those described above may include one or more computing devices. For instance, FIG. 1 provides the example of system 100, which includes computing devices 110 and 120. The computing devices are configured to accept information, perform operations based on that information, and take an action or provide additional information in response. The computing devices may be, or include, a processor that is capable of receiving one or more electrical signals representing information expressed as a numerical value as input, determine a numerical value based on the input in accordance with instructions, and provide one or more electrical signals that represent the determined numerical value as output. Device 110 includes processor 111, which may be a commercially available central processing unit (CPU), application-specific integrated circuit (ASIC) or field-programmable gate array.

The instructions used by a computing device include any set of one or more instructions that are accessed and executed by the computing device. By way of example, device 110 stores values representing instructions 113 and processor 111 is able to access those values and perform, or cause other components of device 110 or system 100 to perform, operations associated with those instructions. For example, device 110 instructions 113 may include machine code (e.g., machine code stored in object code) that is capable of being executed directly by processor 111. Alternatively or in addition, instructions 113 may be stored in a format that requires additional processing before execution, such as a script or collection of independent source code modules that are interpreted on demand. An operation expressed as a single instruction in one format may correspond with multiple instructions in another format, e.g., executing a single command in script may require the execution of multiple machine code instructions. If the computing device has an operating system, the instructions may include instructions that run in, above, or below the operating system layer. For instance, some of the operations described herein may involve the execution of instructions provided by the Chrome or Android operating systems provided by Google, the Windows operating system provided by Microsoft, or the macOS, OS X or iOS operating systems provided by Apple.

The instructions may be stored in a memory. For instance, instructions 113 are stored in memory 112. The memory may be any component that is capable of storing information on a non-transitory storage medium that can be read by a computing device, e.g., registers provided on the same substrate as processor 111, volatile memory such as RAM (random-access memory), non-volatile memory such as flash memory, e.g. a Secure Digital (SD) card, a hard-disk drive, a solid-state drive, optical storage, or tape backups. Device 110, processor 111 and memory 112 are configured so that processor 111 can read, modify, delete and add values stored in memory 112. Memory may be configured to provide less access than the example of memory 112, e.g, memory may be read-only.

Memory may store information that is used by, or results from, the operations performed by the computing device. By way of example, memory 112 stores data 114, which includes values that are retrieved or stored by processor 111 in accordance with instructions 113, such as information that is required or determined by device 110 when performing some of the operations described herein. Values stored in memory 112 may be stored in accordance with one or more data structures. For instance, a value stored in memory 112 may represent a single numeric value (e.g., a binary number, an integer, a floating point number, a Unicode value representing a single character of text, digit or punctuation mark, or a value representing a single machine code instruction), a set of multiple numeric values (e.g., an array of numbers, a string of text characters, XML-formatted data, or a file), or information from which values to be processed in accordance with instructions 113 may be obtained (e.g., a reference to a value stored at a remote location or a parameter of a function from which the required value is calculated).

A computing device may include components for receiving information from the physical environment surrounding the device and allow direct user input to the computing device. Similar to device 110, device 120 includes a processor 111, memory 112, instructions 113 and data 114. Device 120 also includes components that detect information relating to the physical environment in which the component is disposed, and this information may include information provided by user 150. Device 110 includes a user input component 125 having circuitry and other components configured to receive input from user 150, such as information provided tactilely (e.g., a mouse, keyboard, keypad, button or touchscreen). User input components may perform functions that are not primarily directed to user input. By way of example, camera 127 may be used to capture user commands (e.g., hand gestures) and other visual information (e.g., the visual characteristics of a mountain). Microphone 126 may be used to capture user commands (e.g., verbal commands) and other audio information (e.g., the sound of a waterfall).

A computing device may include components for providing information via the physical environment surrounding the device and provide output directly to users. For example, a component may include circuitry that outputs visual, audio or tactile information to users of the device, such as display 130 (e.g., a computer monitor, a touch-screen, a projector or another component that is operable to change a visual characteristic in response to a signal), speaker 128, or motor 126 to vibrate the device.

A computing device may include one or more components for communicating with other computing devices. By way of example, devices 110 and 120 include circuitry (e.g., a network interface) connecting each device to a different node of communication network 190. Network 190 may be composed of multiple networks using different communication protocols. For instance, when device 110 transmits information to device 120, the information may be sent over one or more of the Internet (e.g., via core Internet routers in accordance with the Transmission Control Protocol (TCP) and Internet Protocol (IP)), a cellular network (e.g., in accordance with the LTE (Long-Term Evolution) standard), a local network (e.g., an Ethernet or Wi-Fi network), and a Bluetooth connection. A device may provide information to a user via other devices, e.g., device 110 may display information to user 150 by sending the information over network 190 to device 120 for display on display 130. A computing device may also provide information to another computing device without the use of a network. By way of example, one computing device may output information with a display and another computing device may detect that information with a camera. Although only a few computing devices are depicted in FIG. 1, the system may include a large number of computing devices that are connected to the network at a large number of nodes.

Although FIG. 1 shows computing devices 110 and 120 as individual blocks, each of which contains its own processor and memory, the operations described herein may involve a single computing device or many computing devices, e.g., in the "cloud". For example, various operations described below as involving a single computing device (e.g., a single central processing unit (CPU) in a single server) may involve a plurality of computing devices (e.g., multiple processors in a load-balanced server farm). Similarly, memory components at different locations may store different portions of instructions 113 and collectively form a medium for storing the instructions. By way of further example, operations described as involving a plurality of computing devices may be performed by a single computing device, e.g., rather than sending data to device 110 for processing, device 120 may process the data itself. Alternatively, device 120 may function as a thin client wherein device 110 performs all or nearly all operations that are not directly related to receiving and providing information to users via user input component 125 and display 130. Various operations described herein as being performed by a computing device may be performed by a virtual machine. By way of example, instructions 113 may be specific to a Windows server, but the relevant operations may be performed by a Linux server running a hypervisor that emulates a Windows server. The operations may also be performed by a container, e.g., a computing environment that does not rely on an operating system tied to specific types of hardware.

In various examples described herein, device 110 is a server and devices 120-21 are client devices. For instance, device 110 may be a server and device 120 may be a desktop (notebook) computer system, e.g., processor 121 and memory 122 may be contained in a desktop personal computer, display 130 may be an external monitor connected to the personal computer by a cable, and user input component 125 may be an external keyboard that communicates with the computer via Bluetooth. Alternatively, device 120 may be a wireless phone with a touchscreen that functions as both display 130 and user input component 125. Other client devices may include, by way of example, laptops, notebooks, netbooks, tablets, set-top boxes (e.g., a cable-television set-top box connected to a television) and wearable devices (e.g., a smartwatch). In that regard, a computing device may include other components that are typically present in such devices or general purpose computers but are not expressly described herein.

The system may also store documents having one or more text elements, e.g., a single character, a token (e.g., a sequence of characters between delimiters within a document such as a word) or a sequence of characters of a given length. The text elements may have values, e.g., the value of a character may "a" or "*".

The text element may be stored within a document as a sequence of values that conform with a defined format, e.g., one or more requirements regarding how text elements relating to certain types of information should be stored within a document. To the extent the defined format may be considered a language, the requirements may be considered the grammar of the language. The requirements may relate to, by way of example only, the permissible text element values (e.g., UNICODE or ASCII), where certain types of information needs to be stored relative to the beginning of the document (e.g., documents that comply with HTML version 5 start with "<!DOCTYPE html>"), reserved keywords, and where certain types of information are stored relative to other types of information (e.g., the destination URL of a link on a webpage follows the keyword "href"). While most of the examples below focus on HTML for ease of illustration, the system and operations described herein apply to other defined formats, including proprietary standards.

Example Methods

Operations in accordance with a variety of aspects of the method will now be described. It should be understood that the following operations do not have to be performed in the precise order described below. Rather, various steps can be handled in different order or simultaneously.

The system may identify preexisting samples of information arranged in accordance with a selected defined format. For instance and as shown in FIG. 1, device 110 may use network 190 to access documents that are stored at sources 191 and are consistent with the defined format. By way of example, as shown in FIG. 3, the system may retrieve a plurality of web pages formatted in accordance with HTML from a plurality of web servers 310-12. The web pages 320 collectively form a corpus 330 of HTML documents.

The system may train a machine learning component with the samples of the defined format. In that regard, device 110 may store instructions associated with training a neural network, traversing the neural network, extracting data stored in connection with the neural network, and generating sequences of data values based on the neural network. By way of example, neural network 340 may be a recurrent network such as a Long-Short Term Memory (LSTM) neural network, and device 110 may train the neural network with corpus 330.

Once trained, the weights, biases and other aspects stored in the data structures of machine learning component may represent a model of the defined format, wherein the model is not a set of grammatical rules (such as might be present in a generation-based fuzzing technique) but rather a probabilistic model. For instance, system 100 may use neural network 340 to determine a score (e.g., a numeric value) for a text element that is related to how frequently the value of the particular text element followed the same or similar sequences of text elements in the corpus 330 of HTML documents that were used to train the neural network. In that regard, the neural network may model the defined format by providing scores that are related to the likelihood that the value of a particular text element within a sequence of text elements values will equal a specific value when the sequence conforms with the defined format. The likelihood may be a function of the values of the other text elements in the sequence and the proximity of the other values to the particular text element such as, in the case of a recurrent network, the values of a given number of text elements that precede the particular text element. By way of example, after neural network 340 is trained with corpus 330 of HTML documents, model 350 may indicate (and the scores returned by the neural network may reflect) that the likelihood of "e" following "head" is 33% (e.g., as in "<header>"), the likelihood of ">" is 22% (e.g., as in "<head>"), the likelihood of a space is 11% (e.g., when the word "head" is used in a sentence), the likelihood of "a" is 6% (e.g., as in "headache"), etc. (The example percentage distributions of the example strings and characters discussed herein have been selected for ease of illustration, e.g., they ignore issues such as case sensitivity. A large corpus of publicly-accessible HTML documents may yield different probabilities and distributions than those set forth herein.)

The system may use the scores to identify portions of a test document to be modified. For instance, the scores provided by the neural network 340 may be used to determine whether a particular text element of test document is eligible for mutation. FIG. 4 provides an example of an HTML test document. Like nearly all, if not all, HTML documents, test document 400 starts with the string 410 ("<!DO"), which corresponds with the keywords "!DOCTYPE html". In that regard and as shown in FIG. 5, model 350 may indicate that the likelihood 510 of an HTML document starting with "<" is 100%, the likelihood 511 that the next character is "!" is 100%, and the likelihood 512 that the next character is "D" is also 100%. As a result, neural network 340 may return a relatively high score for each character of the string "<!D" at the beginning of a document because the string has relatively low perplexity, e.g., each character is highly predictable in view of the characters before it. (For the purposes of discussing FIGS. 4 and 5, it is assumed that the neural network 340 is configured to score the next character based on up to five characters that immediately precede it.)

As is also common with many HTML documents, document 400 also contains the keyword "lang=" followed by "[double quote]en[double quote]" (string 420), which indicates that the document is written in English. In that regard, model 350 may indicate that the likelihood 520 that "=" will follow a double quote is 35% (e.g., when "lang" is used as a keyword), the likelihood 521 that "u" will follow "[space] lang" is 25% (e.g., when the word "language" is used in a sentence), and the likelihood that any other character will follow [double quote] may be close to zero (and thus not shown in the chart of FIG. 5). As a result, the character after the string "[space]lang" may be considered to have relatively moderate perplexity because model 350 indicates that there is a 60% chance it will be one of two values. As also indicated in FIG. 5, if the next character after "[space]lang" is "=", the likelihood of the next character being a double quote symbol is relatively high, e.g., 88%. Because of the number of HTML documents that contain the string "[space] lang=[double quote]en[double quote]", the likelihood 523 that the character after that would be "e" is significant. However, because there are many other potential languages for an HTML document beyond English, "e" may be one of many characters that have a significant likelihood of following "lang=[double quote]". As a result, the character after the string "ang=[double quote]" may be considered to have a relatively moderate perplexity and predictability, and neural network 340 may thus return a relatively moderate score for the character "e" in the string "lange=[double quote]e".

FIG. 5 further illustrates the predictability of the character following the string 430, e.g., "inter". The number of popular words that contain the string "inter" may be so numerous that many characters have a small yet relatively equal likelihood 530 of being next. Therefore, since the relative perplexity of the character following the string "inter" is relatively high, neural network 340 may return a relatively low score for that character.

The system may select text elements of a sequence for modification based on the scores returned by the neural network. Modifying keywords in a document may result in an application being unable to parse the document and may thus cause the application to cease processing the document altogether or crash; that may be helpful in some circumstances, but it may also result in many routines of the application going untested. As noted above, keywords tend to be associated with high scores. As a result and as shown in FIG. 6, the system may designate the characters within portions 611 and 612 (containing many keywords) as being sufficiently predictable to remain unmodified and the characters within portions 610 (containing one or many possible language codes) and 630 (containing text intended for display to users) as being sufficiently unpredictable to be modified.

The system may determine whether a text element is eligible or not for modification by comparing the text element's score to a threshold. For instance, device 110 may iterate through the values of the characters of test document 400 and, for each character, determine a score based on the neural network and compare that score to a modification eligibility threshold. The modification eligibility threshold may correspond with a likelihood threshold. By way of example and with reference to FIGS. 4 and 5, model 350 may indicate that the likelihood of "=" being the next character after "[space]lang" is 35%, which exceeds a threshold (line 550) of 30%. As a result, the score returned by neural network 340 may exceed a corresponding modification eligibility threshold and, if so, the device 110 may designate the character as ineligible for modification. (Although FIG. 5 indicates a threshold of 30% for ease of illustration, modification eligibility thresholds associated with likelihood thresholds of 90% or greater may yield more interesting results.) However, if the value of the character following "[space]lang" had been "u" instead of "=", and if the score of "u" was lower than the modification eligibility threshold (e.g., the model indicates that the odds of the character being "u" was relatively unlikely), the device 110 may have designated the character as eligible for modification. The system may further designate all portions between portions of high predictability, such as portions 610 and 630 between portions 611-12 and portions 631-32, respectively, as eligible for modification.

The score and modification eligibility threshold may also be based on factors that are not specific to the value of the text element. For instance, if many character values have a relatively uniform likelihood of following a particular string, the modification eligibility threshold may be lowered, e.g., system 100 may be more likely to designate the character as being eligible for modification. The modification eligibility threshold may also be dynamically determined. For instance, the threshold may be a randomly determined number. By way of example, a character within document 400 may be identified as ineligible for modification when S>Random (0.00-1.00), where S is the score returned by neural network 340 for the character, and the scores and potential random values range between 0.00 to 1.00. As a corollary, the system may designate a text element as being eligible for modification when S>1−Random(0.00-1.00). The score may also be based on the number of potential values that are above a minimum threshold or the score of the most-likely value for the text element.

The portions of the document that were designated as eligible for modification may be randomly changed. By way of example and as shown in FIG. 7, the system may generate a modified document by 700 indicating to a mutation-based fuzzing module that portions 610 and 630 are available for mutation, e.g., characters may be randomly changed, added or deleted.

The portions that are eligible for modification may also be selected for replacement by portions from the same or other documents. For instance and as shown in FIG. 7, the system has swapped the positions of portions 640 and 650. Portions of the test document may also be replaced with portions from other test documents. Moreover, the replacement portion does not have to be the same size as the replaced portion, particularly if the replacement is taken from another document. For example, increasingly larger replacement sequences may be added until a maximum length is reached or a relatively high perplexity point is reached.

When determining whether a text element should be modified, the system may consider not only the preceding text elements but subsequent text elements as well. For example, the FIG. 6 shows string "</head><body>" as a single block 631. However, the model may indicate that the character "b" is relatively unpredictable since it may be highly likely that a keyword will follow "ead><" but the precise keyword itself may be hard to predict. However, once it is known that the value of the next character is "b", the model may indicate that the remaining characters of the block 631 are highly predictable because the tag "<body>" often follows "<head>". As a result and in some aspects, if a single low-scored character is sandwiched between strings of high-scored characters, the system may check whether the lower-scored character and subsequent high-scored characters form a single keyword.

The system may measure one or more characteristics of a set of computer instructions' performance as they process the test sequences. By way of example and as shown in FIG. 8, device 110 may load test document 700 into a browser 810 and generate a report 805 regarding how well the browser performed. The report may include the name 811 of the document and information such as whether loading the document caused particular routines 820-23 (e.g., routines relating to rendering content, executing javascript, communicating information over a network and securing data) and third party plug-ins 830-32 to be called and, if so, whether any errors occurred. The system may also calculate, and the report may also include, a test score 815 based on other performance characteristics such as the document's coverage (e.g., the number of different routines that were called, the total number of unique lines of code that were executed), processing speed (e.g., load times), CPU and memory usage, whether any interesting results were encountered (e.g., errors, security issues such as buffer overflow errors and decompression bombs, plug-in failure 832, the application crashed, etc.), and any other measurable aspects relating to performance. Different events may be weighted differently when calculating a test score.

The performance characteristics may be used to determine whether further modifications should be made to the application or document. For instance, after the initial test, the document may be modified as described above and tested once again. As shown in FIG. 9, the system may then generate a second report 905, which indicates that an additional routine 921 of the browser and third-party plug-in 931 were called. The report also indicates that third-party plugin 930, which processed the prior version of the document without difficulty, failed with a buffer overflow error that could, in some circumstances, create security issues for data handled by that plug-in. As a result, the calculated test score 915 of the document increased relative to the first report 805. The system may repeat the process of identifying portions of a document that are eligible for modification based on scores returned by the neural network, modifying the eligible portions of the document, and determining a test score for the document until the document's test score stops increasing. If the defined format is PDF, the system may test a PDF reader, e.g., the functionality of a browser for displaying PDF documents, a stand-alone PDF application for displaying and editing PDF documents, etc.

The system may also be used to generate a completely new set of test documents in compliance with the model of the defined format. For instance, the system may create a new test document and randomly select the value of the text elements based on the likelihood of their occurrence as indicated by the model represented by the neural network. By way of example and as shown in part in FIG. 5, model 350 may indicate that all HTML document in the corpus begin with "<DOCTYPE html". As a result, when system 100 uses neural network 340 to randomly generate a new document, the first fourteen characters of the document would be "<DOCTYPE html". Thereafter, however, the probabilities may change, e.g., the model may indicate that 80% of the time the string "html" is followed by a space and 20% of the time it is followed by a ">". As a result, the system may randomly select a space or ">" by generating a random number between 0.00 and 1.00 and determining whether the number is greater or less than 0.80 and select a space or ">" accordingly as the next character of the generated document. The remaining characters of the document may be similarly determined. The randomly-generated test documents may be then be modified and tested as described above.

The model may be periodically updated to reflect changes to requirements and features of the defined format. For instance, neural network 340 may be periodically trained with recently created documents in order to keep model 350 up to date with changes to the defined format. Depending on the complexity of the defined format and other circumstances, the cost and other resources required to train and maintain a neural network such as neural network 340 may be less than the cost and resources required to write and maintain computer programs that create or analyze documents based on a rigid set of grammatical rules that were set by the people or organization that defined the format.

While the use of a recurrent neural network to score text elements may be particularly advantageous in certain applications, the system may use other components to provide a score that is based on the relationship of a given sequence of text element values to sequences of text element values that conform with a defined format. For instance, in lieu of a recurrent neural network, the machine learning component may be a support vector machine trained with N-grams copied from documents that comply with the deformed format, or a hidden Markov model. Moreover, in lieu of machine learning, the text-element scoring component may include a statistical regression routine that uses a sequence containing the text-element as the dependent variable and sequences in the corpus as independent variables.

Figure 10:
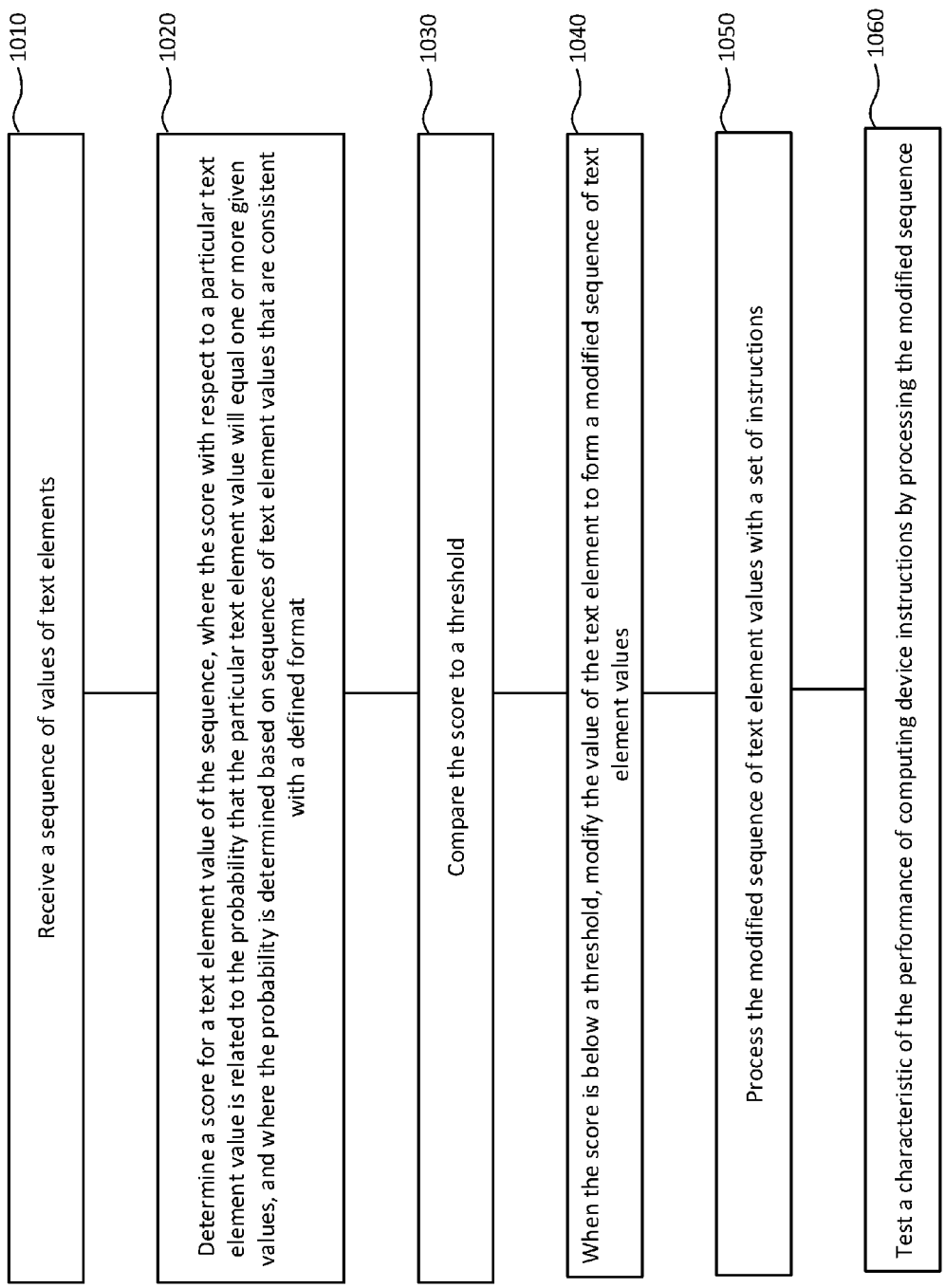
FIG. 10 is a flow diagram in accordance with aspects of the disclosure.

FIG. 10 provides a flowchart of a method that may be executed by one or more computing devices. At block 1010, a sequence of values of text elements is received. At block 1020, a score for a text element value of the sequence is determined, where the score with respect to a particular text element value is related to the probability that the particular text element value will equal one or more given values, and where the probability is determined based on sequences of text element values that are consistent with a defined format. At block 1030, the score is compared to a threshold. At block 1040, when the score is below a threshold, the value of the text element is modified to form a modified sequence of text element values. At block 1050, the modified sequence is processed with a set of instructions. At block 1060, a characteristic of the performance of the computer instructions is tested by processing the modified sequence with the computer instructions.

As these and other variations and combinations of the features discussed above can be utilized without departing from the invention as defined by the claims, the foregoing description of the embodiments should be taken by way of illustration rather than by way of limitation of the invention as defined by the claims. The provision of examples of the invention (as well as clauses phrased as "such as," "e.g.", "including" and the like) should not be interpreted as limiting the invention to the specific examples; rather, the examples are intended to illustrate only some of many possible aspects. Similarly, references to "based on" and the like means "based at least in part on".

The invention claimed is:

1. A method comprising:
    receiving a sequence of values of text elements;
    determining, with one or more computing devices, a score for a text element value of the sequence, where the score is related to the probability of a particular text element value equaling one or more given values, where said probability is based on sequences of text element values that are consistent with a defined format, and where determining the score with respect to the value of the particular text element in a particular sequence of text elements is related to how frequently the value of the particular text element follows same or similar sequences of the text element values that are consistent with the defined format;
    comparing, with the one or more computing devices, the score to a threshold;
    when the score is below a threshold, modifying, with the one or more computing devices, the value of the text element to form a modified sequence of text element values;
    processing, with the one or more computing devices, the modified sequence of text element values with a set of instructions; and
    testing, with the one or more computing devices, a performance characteristic of the set of instructions when the set of instructions process the modified sequence of text element values.

2. The method of claim 1, wherein determining the score comprises determining the score based on a recurrent neural network trained with the sequences of values of text elements that conform with the defined format.

3. The method of claim 2, wherein the recurrent neural network is a Long-Short Term Memory (LSTM) neural network.

4. The method of claim 2, wherein the sequences of values of text elements that conform with the defined format are accessible via the Internet.

5. The method of claim 4, wherein the defined format is HTML or PDF.

6. The method of claim 1, further comprising determining a test value based on the performance characteristic.

7. The method of claim 6, further comprising:
    determining a test score based on the performance characteristic; and
    continuing to determine a test value for a given sequence of text element values, modify a value of one or more text elements of the given sequence of text element values, and test the performance characteristic of the instructions with the given sequence until the test value exceeds a threshold.

8. A system comprising:
    one or more computing devices, and
    a memory storing instructions executable by the one or more computing devices,
    wherein the instructions comprise:
    receiving an initial sequence of text elements having values;
    determining a first score for the value of a first text element of the initial sequence where the first score is related to the probability of a particular text element value equaling one or more given values where said probability is based on sequences of text element values that are consistent with a defined format, and wherein determining a score with respect to the value of the particular text element in a particular sequence of text elements is related to how frequently the value of the particular text element follows same or similar sequences of text element values that are consistent with the defined format;
    determining a second score for the value of a second text element of the initial sequence, wherein there is a third text element between the first and second text elements in the initial sequence;

comparing the first and second scores to a threshold;
when the first and second scores are above the threshold, generating a modified sequence of text elements having values, where the value of a first text element in the modified sequence equals the value of the first text element in the initial sequence, the value of a second text element in the modified sequence equals the value of the second text element in the initial sequence, the value of a third text element in the modified sequence is different from the value of the third text element in the initial sequence, and the third text element is in between the first and second text elements in the sequence;
processing, with the one or more computing devices, the modified sequence of text elements with an application; and
testing, with the one or more computing devices, a performance characteristic of the application when the application processes the modified sequence of text element values.

9. The system of claim 8, wherein determining a score comprises determining the score based on a recurrent neural network trained with the sequences of text element values that are consistent with a defined format.

10. The system of claim 9, wherein the recurrent neural network is a Long-Short Term Memory (LSTM) neural network.

11. The system of claim 10, wherein the defined format is PDF, the neural network is trained with PDF documents, and the application comprises a PDF reader.

12. The system of claim 8, wherein the instructions further comprise:
receiving the modified sequence of text elements having values, the modified sequence including fourth, fifth and sixth text elements, the sixth text element being between the fourth and fifth text elements;
determining a fourth score for the value of a fourth text element of the modified sequence,
determining a fifth score for the value of a fifth text element of the modified sequence,
comparing the fourth and fifth scores to the threshold;
when the first, second, fourth and fifth scores are above the threshold, modifying the value of the third text element to match the value of the sixth text element.

13. The system of claim 12, wherein the instructions further comprise modifying the value of the sixth text element to match the value of the third text element.

14. A system comprising:
one or more computing devices;
a memory storing instructions executable by the one or more computing devices;
wherein the instructions comprise:
receiving a document containing a sequence of text characters;
determining a score for each of a plurality of characters in the sequence of text characters of the document, wherein the score of a character is determined based on the value of the character, the value of one or more preceding characters in the document, and a machine learning component trained with sequences of characters conforming with a defined format, wherein determining the score with respect to the value of a particular text character in a particular sequence of text characters is related to how frequently the value of the particular text character follows same or similar sequences of text character values that are consistent with the defined format;
when the score of a character below a threshold, associating the character with a set of characters eligible for modification;
modifying at least one of the characters in the set of characters; and
after modifying at least one of the characters in the set of characters, measuring the performance of an application as the application processes the document by testing the performance characteristic of the application when the application processes the modified one of characters in the set of characters.

15. The system of claim 14, wherein the machine learning component comprises a recurrent neural network.

16. The system of claim 15, wherein the recurrent neural network is a Long-Short Term Memory (LSTM) neural network.

17. The system of claim 14, wherein modifying a character comprises replacing the character with a plurality of characters.

18. The system of claim 14, wherein the modifying a character comprises replacing the character with other characters in the set of character.

19. The system of claim 14, wherein the score of a character is further based on the value of at least two preceding characters in the document.

20. The system of claim 14, wherein the received document is a first document and wherein the instructions further comprise:
generating a second document that is a copy of the first document after the at least one or more characters have been modified, determining the scores of the characters of the second document, modifying at least one character of the second document based on the character's score; and
depending on the performance of the application, generating a third document that is a copy of the second document after the at least one or more characters of the second document have been modified, determining the scores of the characters of the third document, modifying at least one character of the third document based on the character's score, and measuring the performance of the application as the application processes the third document.

* * * * *